(No Model.)

T. A. WATSON.
VELOCIPEDE PEDAL.

No. 471,921. Patented Mar. 29, 1892.

Witnesses
Jas. J. Maloney
M. E. Hill

Inventor
Thomas A. Watson
by Jo. P. Livermore
Att'y

UNITED STATES PATENT OFFICE.

THOMAS A. WATSON, OF BRAINTREE, MASSACHUSETTS.

VELOCIPEDE-PEDAL.

SPECIFICATION forming part of Letters Patent No. 471,921, dated March 29, 1892.

Application filed February 3, 1891. Serial No. 379,989. (No model.)

*To all whom it may concern:*

Be it known that I, THOMAS A. WATSON, of Braintree, county of Norfolk, State of Massachusetts, have invented an Improvement in Velocipede-Pedals, of which the following description, in connection with the accompanying drawings, is a specification, like letters on the drawings representing like parts.

My invention relates to velocipede-pedals, the object of the invention being to relieve the rider from the jar and vibration produced by riding over rough roads. This result is accomplished in accordance with this invention by interposing air-cushions between the driving-cranks or levers and the feet of the rider, so that the shocks which act upon the wheels or frame-work of the vehicle are not transmitted to the body of the rider. To attain this end elastic-walled air-tight chambers are applied to the pedals and constitute the foot-rests, by which the power is applied from the foot of the rider to drive the vehicle.

Figure 1:
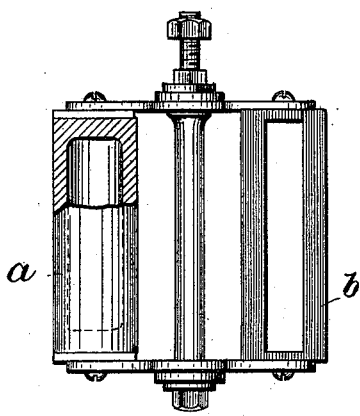
Figure 2:
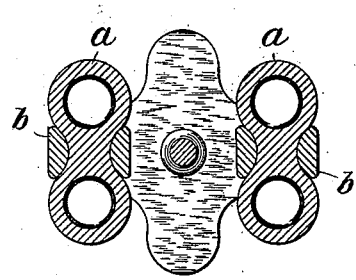
Figure 3:
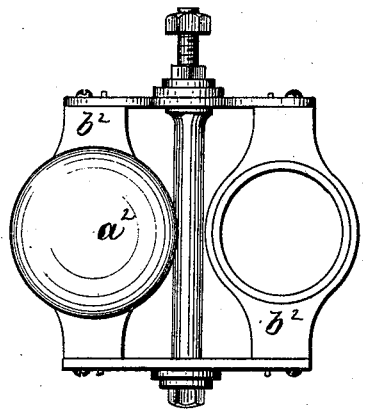
Figure 4:
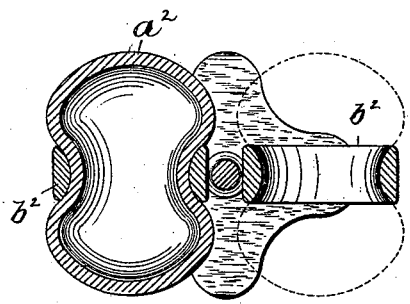

Figure 1 is a plan view of the pedal, partly in section, and with one of the cushioned foot-rests removed; Fig. 2, a transverse section of the pedal shown in Fig. 1; Figs. 3 and 4, a plan view and transverse section showing a modified construction of the pedal.

In order to relieve the rider from the vibration that is usually transmitted from the cranks to the feet of the rider the pedal, instead of having the usual rubber or metallic foot-rests, which have but little cushioning effect, are provided with foot-rests $a$, which are [in the form of air-tight hollow yielding walled chambers containing air, which thus affords a very considerable elasticity and cushioning effect sufficient to relieve the feet of the rider from the jar and vibration usually received.

In the construction shown in Figs. 1 and 2 the foot-rests $a$ have two separate air-chambers at opposite sides of the pedal, either side of which may be engaged by the foot of the rider in the usual manner, and the metallic cross-bar or frame-pieces $b$ of the pedals are made as open frames, in which the double-chambered foot-rests $a$ are supported, as clearly shown in Fig. 2.

In the construction shown in Figs. 3 and 4, the cross-bars $b^2$ are provided with annular openings, in which single elastic walled air-chambers $a^2$ are secured, the said chambers projecting above and below the frame-openings in the cross-pieces, so as to afford cushioned foot-rests at opposite sides of the pedal.

It is obvious that the shape of the air-chambers may be varied, and that two or more small air-chambers may be placed side by side in a construction like that shown in Figs. 3 and 4, although the construction there represented is believed to be the simplest and most efficient.

The cross-bars $b$ or $b^2$ of the pedals should be fastened in pedal-frames, so as not to rotate therein in order to properly present the cushions at each side of the pedal.

By the employment of air-cushions interposed between the actuating cranks or levers of the vehicle and the feet of the rider, as just described, the rider is protected at this point from the jar and vibration of the vehicle, while the rigidity and durability of the vehicle itself is not impaired, as is the case where it is attempted to interpose air-cushions between the vehicle itself and the ground or to introduce springs of various kinds into the frame-work of the vehicle itself.

I claim—

1. The combination, with the pedal-frame of a velocipede, of foot-rests secured thereto having elastic-walled air-tight chambers projecting at both sides of the pedal, substantially as described.

2. The combination of the pedal, provided with cross-bars having open frames, of foot-rests supported in the said cross-bars composed of hollow elastic-walled air-chambers projecting at each side of said cross-bars, substantially as and for the purpose described.

In testimony whereof I have signed my name to this specification in the presence of two subscribing witnesses.

THOMAS A. WATSON.

Witnesses:
M. E. HILL,
JOS. P. LIVERMORE.